Patented May 23, 1950

2,508,448

UNITED STATES PATENT OFFICE 2,508,448

AZO PIGMENTS AND COATING COMPOSITIONS CONTAINING SAME

Alfred Anthony Brizzolara, Belleville, N. J., assignor to E. I. du Pont de Nemours & Company, Wilmington, Del., a corporation of Delaware No Drawing. Application February 3, 1948,
Serial No. 6,021

6 Claims. (Cl. 260—40)

1

This invention relates to improved maroon coating compositions, and more particularly to maroon enamels of excellent durability and relative freedom from reactivity on storage, and to pigment compositions for obtaining such coating compositions.

In the copending application for United States Letters Patent of Joseph H. Cooper, Serial No. 648,835, filed February 19, 1946, a novel maroon azo pigment and method for producing the same is disclosed. Such pigment is obtained by coupling diazotized 5-nitro-2-amino anisole with the ortho toluidide of 2-hydroxy-3-naphthoic acid, and is represented by the formula

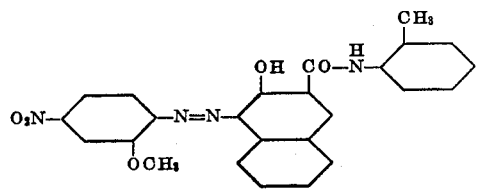

As therein disclosed, maroon enamels containing such pigment exhibit a degree of durability not heretofore obtainable in similar vehicles with known pigments of comparable color. Due to its exceptionally good durability characteristics in both nitrocellulose lacquer and alkyd resin enamels, its combination of dark masstone with yellow undertone and relatively high transparency, such pigment is eminently suited for use in automotive finishes.

Despite the superior properties of the enamel films made with the above pigment, such enamels exhibit certain defects which disadvantageously reduce their usefulness. These defects manifest themselves in a serious tendency of the enamels to become progressively more viscous on storage whereby eventually they become gell-like in form and hence no longer utilizable in their intended purpose. This phenomenon is generally attributed to reactivity of the pigment with the coating composition vehicle in which the pigment is dispersed.

Thus, if enamels such as those described in said copending Cooper application Serial No. 648,835 are used immediately after grinding, the benefits ascribed to the use of the new maroon pigment are readily attained. If, however, such enamels are stored for substantial periods of time, in most instances they will be found to be much more viscous than originally and, in many cases, depending on the length of time of storage or standing, will have proceeded to the point where

2 the enamel can no longer be employed in the use intended.

It has now been found that the disadvantageous characteristics exhibited in enamel coatings by an insoluble maroon azo pigment of the type mentioned in the aforesaid Cooper application can be effectively remedied, and, accordingly, it is among the objects of this invention to prepare an improved form of pigment composition for use in such coatings, as well as to prepare maroon synthetic enamels of desirable durability and which are relatively free from objectionable reactivity and resistant toward becoming more viscous on storage. A further object is to provide for the preparation of new maroon pigment compositions which do not induce objectionable reactivity in synthetic enamel vehicles. Other objects and advantages of the invention will be evident from the ensuing description thereof.

These and other objects are attained in this invention which comprises employing in a coating composition susceptible to reactivity in the presence of the pigment composition set forth in said Cooper application Serial No. 648,835, a regulated proportion of an additional azo pigmenting substance, viz., a metal salt of the azo dyestuff obtained by coupling 5-nitro-2-amino anisole with 2-hydroxy-3-naphthoic acid.

In a more specific and preferred embodiment, the invention comprises utilizing as an essential pigmenting ingredient in a maroon synthetic enamel, in order to impart improved durability and stability characteristics thereto, a pigment mixture comprising a major amount (about 75% to 95% of the total pigment composition) of the azo pigment resulting from coupling diazotized 5-nitro-2-amino anisole with the ortho toluidide of 2-hydroxy-3-naphthoic acid, and a minor amount (about 25% to 5% of the total pigment present) of the manganese salt of the azo dyestuff resulting from coupling diazotized 5-nitro-2-amino anisole with 2-hydroxy-3-naphthoic acid.

In practically applying the invention, two steps are involved. In the first step, the adjuvant pigment mixture is prepared in the desired form, while in the second step a desired coating composition utilizing such pigment in the proper amount is prepared.

The accomplishment of the first step involves the preparation and admixture of the pigmenting ingredients or complex which is to be employed in the coating formulation. Thus, diazotization can be conveniently effected of 5-nitro-2-amino anisole by conventional means with coupling of 2-hydroxy-3-naphthoic acid preferably in a suspension buffered with sodium bicarbonate being then had. The pigment can then be isolated and used in the form of its free acid or sodium salt but since it contains a solubilizing carboxy group, it is preferred to convert it to an insoluble metallic salt of which the manganese salt is most desirable and preferred. Complete conversion to the insoluble manganese (or other metal) salt requires some heat development. It has been found that two forms of the pigment can be obtained, that these two forms exhibit different X-ray diffraction patterns, presumably because of unique crystal structures, that they exhibit widely different tinctorial properties and that they differ widely in their degree of effectiveness for the purposes of this invention.

Thus, if the pigment slurry coupled by the preferred method is rapidly heated in the presence of a solution of a manganese salt to the boil and then quickly cooled, the preferred form of the pigment is obtained. It exhibits a dark maroon masstone and a relatively weak bluish tint. If, on the other hand, the heat development is continued for a longer period, the masstone becomes much lighter and the tint much stronger and yellower. Although in many ways more desirable as a pigment, this second form, though contemplated as utilizable herein, is less effective for use in the invention.

Similarly, diazotization and coupling of 5-nitro-2-amino anisole with the ortho toluidide of beta-hydroxy naphthoic acid is effected in accordance with the disclosure of said Cooper application Ser. No. 648,835. The resulting pigments are then intimately associated with one another in a conventional paddle type or other form of mechanical mixer, preferably in the percentage proportions set out above.

Following preparation of my novel pigment complex, I then resort to the second or final step of my invention, i. e., the pigment mixture is dispersed in a suitable coating composition, preferably an enamel vehicle, by grinding in a suitable paint or other conventional mechanical mill.

To a clearer understanding of the invention, the following specific and illustrative examples are given:

EXAMPLE I

An adjuvant pigment useful in the invention was prepared by first slurrying 204 lbs. of 5-nitro-2-amino anisole in 248 gallons of water. To the resulting slurry a solution of hydrochloric acid equivalent to 129 lbs. of 100% HCl was added. After stirring a few minutes the suspension was cooled with ice to 0° C. at a volume of about 500 gallons and a solution of 84 lbs. sodium nitrite in about 100 gallons water was added over a 10-minute period and the diazo solution was then stirred for about 30 minutes to complete the diazotization.

In a separate vessel 132 lbs. of sodium hydroxide was dissolved in about 300 gallons of water to which was then added 240 lbs. of 2-hydroxy-3-naphthoic acid. Solution was then brought about by heating to about 60° C. after which it was poured into a solution of 51 lbs. sodium bicarbonate in 3200 gallons of water and the suspension adjusted to a total volume of about 4300 gallons at 30° C. Coupling was then brought about by adding the diazo beneath the surface of the well-agitated suspension over a period of 15 to 20 minutes. After a short stirring period to insure completion of coupling, a solution of 272 lbs. of manganese sulfate in a total volume of about 360 gallons was added slowly and the pigment suspension heated rapidly to the boil and immediately filtered, washed free of soluble chlorides and dried at a temperature of about 60° C. About 504 lbs. of a dark maroon pigment resulted.

Ten pounds of the maroon pigment thus obtained were then thoroughly mixed in a conventional paddle mixer with 90 lbs. of the maroon pigment obtained by coupling diazotized 5-nitro-2-amino anisole with the ortho toluidide of 2-hydroxy-3-naphthoic acid, as described in said Cooper application Ser. No. 648,835, and in the following manner:

An aqueous slurry is prepared from 168 parts of 5-nitro-2-amino-anisole with 1750 parts of water. To this is added a solution containing 108 parts hydrochloric acid, 100%, and the slurry is stirred for ten minutes. This is then cooled to 0–5° C. by the addition of sufficient ice, and this temperature is maintained throughout the diazotization. The volume is adjusted to 3500 parts with ice and water, and diazotization is effected by the addition of 69 parts of sodium nitrite, 100%, dissolved in 500 parts of water. Stirring is continued for an additional 30 minutes, at the end of which period the diazo is clarified. The clarified solution is a clear yellow color and is maintained at 0–5° C. throughout coupling.

A solution of 68 parts of sodium hydroxide in 2500 parts of water is heated to 90° C. To this is added gradually and with constant stirring 290 parts of the ortho toluidide of beta-hydroxy naphthoic acid, and stirring is continued until solution is complete. The solution is then diluted by the gradual addition of water to 5000 parts at 90° C., and this is then added to a solution containing 5.6 parts of sodium hydroxide and 53.5 parts of sodium carbonate diluted with water to 22,500 parts at 30° C. The volume is adjusted to 30,000 parts at 30° C. prior to coupling.

Coupling is effected by adding the diazo at 0–5° C. to the ortho toluidide of beta-hydroxy naphthoic acid solution at 30° C. in 15 minutes. Stirring is continued for 60 minutes, at the end of which time the pH of the slurry is 9.5±0.5. The slurry is then heated to the boil in 30 minutes, and maintained at this temperature for 15 minutes. The hot slurry is filtered immediately, and the press cake washed free of soluble chloride ion. The resulting maroon pigment is dried at 60° C. The yield of dry pigment is 425 parts.

As a result of such admixture, there was obtained my novel pigment composition of special utility in synthetic resin enamels.

EXAMPLE II

An alkyd resin enamel of the following composition was prepared, the designated pigment being that obtained from Example I:

| | Parts |
|---|---|
| Maroon pigment | 9.63 |
| Alkyd resin solution (50% solids-drying oil modified) | 81.60 |
| Petroleum spirits | 8.02 |
| Lead naphthenate drier (24%) | 0.50 |
| Cobalt naphthenate drier (6%) | 0.25 |
| | 100.00 |

The pigment was ground in a ball mill with a portion of the resin solution and solvents, and the remaining ingredients were mixed with the resulting mill base at a later stage. The resulting enamel was of desired maroon shade and of excellent durability both with respect to color retention and film integrity.

Viscosity measurements were made on a Krebs modification of the Stormer viscosimeter with paddle type agitator, as described on page 306 of the 1946 edition of Gardner's treatise on "Physical and Chemical Examination of Paints, Varnishes, Lacquers and Colors." Viscosities were recorded in KU (Krebs units) as defined therein, the numerical values being a direct function of the time required for the rotation of the paddle in the enamel. This testing method is also described in ASTM method D-562-44 except that the numerical values are a different function of the time measured.

Using this test, the initial viscosity of the enamel of this example was 65 KU and, on storage of the enamel for 8 days at 50° C., only a slight increase to 68 KU was found to exist.

EXAMPLE III

Enamels were made by the process of Example II, except that instead of employing therein the mixed pigment product resulting from Example I, the separate pigments of such mixture were either independently utilized or varying amounts thereof were employed as set forth in the following table, which table also lists their viscosities after various storage periods:

Table I

| | | | | | | |
|---|---|---|---|---|---|---|
| Maroon pigment of Cooper appln. Ser. No. 648,835 | 100% | 95 | 90 | 85 | 75 | — |
| Maroon pigment (manganese salt of azo dyestuff of coupled 5-nitro-2-amino anisole with 2-hydroxy-3-naphthoic acid) | — | 5 | 10 | 15 | 25 | 100 |
| Initial viscosity, KU | 66 | 65 | 65 | 65 | 66 | 72 |
| Viscosity after 1 day at 50° C. | 88 | 68 | 67 | 68 | 68 | 82 |
| Viscosity after 5 days at 50° C. | 90 | 64 | 68 | 67 | 68 | 82 |
| Viscosity after 8 days at 50° C. | 100 | 72 | 68 | 69 | 70 | 108 |

It is apparent from the above table that employment alone in these enamels of either pigment used in my novel pigment composition results in enamels having initially usable viscosity but that such viscosity disadvantageously increases substantially on aging. In contrast thereto, enamels containing the pigment mixture of this invention exhibit equal or lower initial viscosities and desired resistance to viscosity increase on aging.

The conditions of preparing the organic toners of said Copper application Ser. No. 648,835 and of coupling diazotized 5-nitro-2-amino anisole with 2-hydroxy-3-naphthoic acid are obviously not critical except for the requirement that the coupling bath be maintained in an alkaline condition, as is readily apparent to anyone skilled in the art of azo pigments. To obtain the optimum results, it is preferred, in the instance of the adjuvant pigment, that the alkalinity be maintained with sodium carbonate or bicarbonate, as shown above.

Similarly, although the manganese salt comprises a preferred form of the stabilizing pigment to be employed herein, because manganese as the salt-forming metal promotes excellent durability in the pigment, salts of other metals, such as those of calcium, barium, strontium, iron, nickel and cobalt, etc., which are adapted to afford satisfactory insolubility characteristics in the pigment can also be used. Likewise, the time and temperature employed in the metallization is variable, temperatures ranging from 50-100° C. being usually adequate. However, for purposes of controlling reactivity as described above, the cation appears to be relatively unimportant. Both the free acid and the sodium salt have proved effective but their tendency to solubility in many media renders such forms less preferred and desirable.

The following comprises a structural formula of the stabilizing adjuvant pigment utilizable herein:

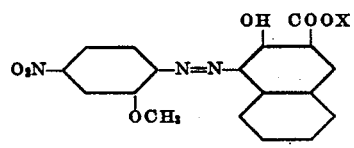

in which X is one of the group consisting of hydrogen, the alkali metals, the alkaline earth metals, manganese, iron, nickel and cobalt. As noted, the particular salt of the metal used for conversion of the azo to its metallic salt is unimportant, availability and solubility in water being the only important considerations.

The manganese salt of this adjuvant pigment is capable of existing in two forms which differ markedly in color, crystal structure, as shown by characteristic X-ray diffraction patterns, and in their effectiveness for the control of reactivity. The process described in Example I gives the more effective and hence preferred form which is characterized by a dark maroon color in full shade and a relatively weak, bluish red tint.

If, however, the heat development conditions are made more rigorous (either a longer time at the boil or a still longer time at a somewhat lower temperature) a transformation occurs to a much lighter red in full shade and to a very much stronger and yellower tint. In fact, a superficial examination would indicate this form to have far more desirable pigment properties but, strangely, it is much less effective in controlling reactivity of enamels such as those of the example given.

The characteristic differences in color of these products is also apparent from spectrophotometric curves made on a General Electric Recording Spectrophotometer, particularly those made from full shade inks of the two colors in lithographic varnish and from tints of these same inks in lithographic varnish, mixed with an ink containing a pigment grade of zinc oxide in such proportions that the final ink contained 1 part of colored pigment for 50 parts of zinc oxide.

While the invention has been illustrated as applied to the preparation of a coating composition containing a pigment mixture contemplated in this invention and utilizing a conventional alkyd resin as the vehicle, it is also applicable to the production of enamels utilizing any oil-modified synthetic resins such as melamine or urea-formaldehyde modified drying oil alkyds, melamine or urea-formaldehyde non-oxidizing oil alkyds, and the like, as well as to the preparation of nitrocellulose lacquers and of oil type paints. Such general types of utilizable coating compositions are referred to in U. S. Reissue Patent 21,247 and U. S. Pat. 2,225,665. My novel pigment complex is outstandingly useful in the production of stable, durable synthetic resin or enamel coatings employable in automobile finishes, through dispersion of the pigment in synthetic resin vehicles through the customary paint grinding procedure in a ball, roller, or other type of conventional mechanical mill with suitable modification of the mill base. Resinated coating compositions containing an alkyd resin are well-known, and comprise certain types of polyhydric alcohol-polybasic acid resins, especially the so-called modified polyhydric alcohol-polybasic acid resins or resinous condensation products obtained by reacting one or more polyhydric alcohols and one or more polybasic acids with one or more modifying ingredients, such as drying oils, semi-drying oils, synthetic drying oils, and monobasic acids, etc. One notable example thereof comprises the condensation products of glycerol and phthalic anhydride with linseed oil. These synthetic resin vehicles or solutions are usually prepared by heating a mixture of the resin-producing ingredients, other than solvents, at temperatures above the melting point and until completion of the resinification. The properties of the resin can be modified as desired by varying the ingredients and conditions of preparation. As already noted, specific modified alkyd resins contemplated hereunder include melamine or urea-formaldehyde-modified drying oil alkyds, melamine modified non-oxidizing and urea-formaldehyde-modified non-oxidizing oil alkyd resins.

It will be understood that many widely different variations in the invention may be resorted to without departing form its underlying spirit and scope and that it is not to be construed as limited to the specific embodiments hereinabove set out, except as defined in the appended claims.

I claim as my invention:

1. A new insoluble azo maroon pigment composition consisting of an intimate mixture of from about 75–95 parts by weight of the azo dyestuff having the formula:

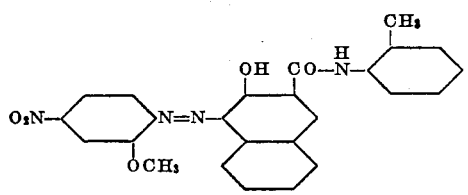

and from about 25–5 parts by weight of the insoluble azo pigment having the formula:

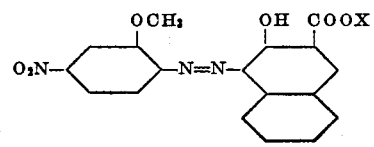

in which X is selected from the group consisting of hydrogen and a salt-forming metal.

2. A new insoluble maroon pigment composition consisting of an intimate mixture of from about 75–95 parts by weight of the insoluble azo pigment having the formula:

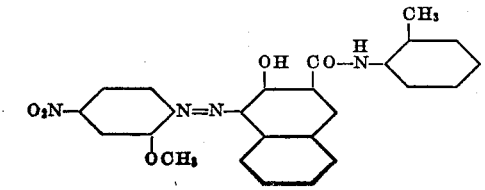

together with from about 25–5 parts by weight of the insoluble manganese salt of the azo pigment having the formula:

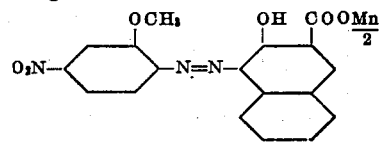

3. A new maroon pigment composition consisting of an intimate mixture of about 90 parts by weight of the insoluble azo maroon pigment having the formula:

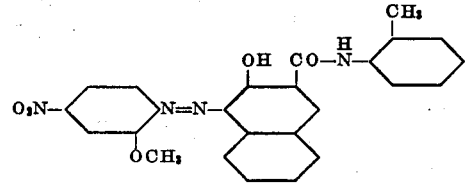

together with about 10 parts by weight of the insoluble manganese salt of the azo pigment having the formula:

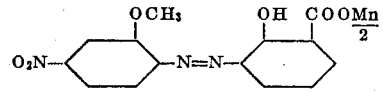

4. A durable synthetic alkyd resin coating composition containing as an essential pigmenting ingredient a mixture comprising from about 75–95 parts by weight of the azo dyestuff having the formula

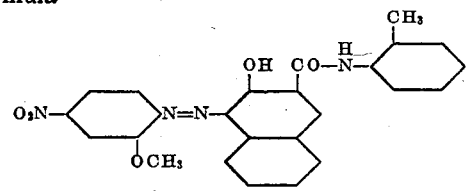

and as a viscosity stabilizing adjuvant for said composition, from about 25–5 parts by weight of the azo pigment having the formula

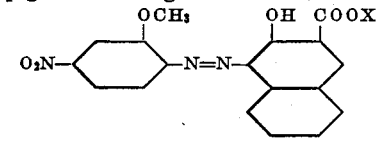

wherein X is selected from the group consisting of hydrogen and an insolubilizing salt-forming metal.

5. A durable synthetic alkyd resin coating composition containing as an essential pigmenting ingredient a mixture comprising from about 75–95 parts by weight of the azo dyestuff having the formula

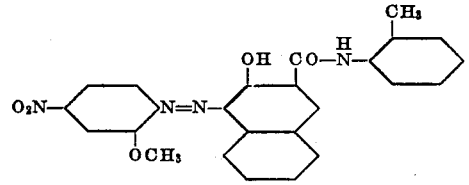

and from, as a viscosity stabilizing adjuvant for said composition, about 25–5 parts by weight of the azo pigment which is characterized by a dark maroon color in full shade and a weak, bluish red tint having the formula

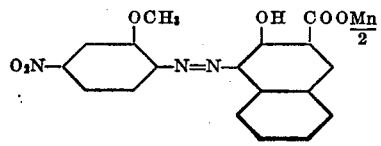

6. A durable synthetic alkyd resin coating composition containing as an essential pigmenting ingredient an intimate mixture of about 90 parts by weight of the insoluble azo pigment having the formula:

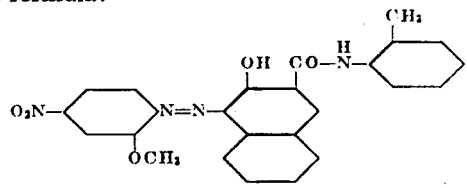

together with, as a viscosity stabilizing adjuvant for said composition, about 10 parts by weight of the insoluble manganese salt of the azo pigment having the formula:

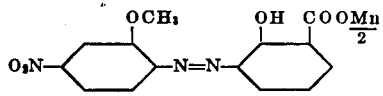

ALFRED ANTHONY BRIZZOLARA.

REFERENCES CITED

The following references are of record in the file of this patent:

UNITED STATES PATENTS

| Number | Name | Date |
|---|---|---|
| 1,858,628 | Laska et al. | May 17, 1932 |
| 2,034,054 | Morschel | Mar. 17, 1936 |
| 2,191,530 | Hucks | Feb. 27, 1940 |
| 2,225,665 | Siegel | Dec. 24, 1940 |

FOREIGN PATENTS

| Number | Country | Date |
|---|---|---|
| 6,379 | Great Britain | of 1912 |
| 193,834 | Great Britain | May 8, 1924 |
| 334,529 | Great Britain | Sept. 1, 1930 |